United States Patent
Klemen et al.

[11] Patent Number: 6,022,287
[45] Date of Patent: Feb. 8, 2000

[54] MODULARLY CONSTRUCTED VEHICULAR TRANSMISSION

[75] Inventors: Donald Klemen; Michael Roland Schmidt, both of Carmel, Ind.

[73] Assignee: General Motors Corporation, Detriot, Mich.

[21] Appl. No.: 09/136,229

[22] Filed: Aug. 19, 1998

[51] Int. Cl.$^7$ .............................. F16H 3/72; B60K 1/00
[52] U.S. Cl. ........................ 475/5; 180/65.2; 180/65.7
[58] Field of Search ................................ 475/5, 1, 149; 477/2, 3; 180/65.2, 65.6, 65.7

[56] References Cited

U.S. PATENT DOCUMENTS

| | | | |
|---|---|---|---|
| 5,396,968 | 3/1995 | Hasebe et al. | 180/65.6 |
| 5,427,196 | 6/1995 | Yamaguchi et al. | 180/65.2 |
| 5,558,588 | 9/1996 | Schmidt | 475/5 |
| 5,558,589 | 9/1996 | Schmidt | 475/5 |
| 5,558,595 | 9/1996 | Schmidt et al. | 477/3 |
| 5,562,565 | 10/1996 | Moroto et al. | 477/3 |
| 5,643,119 | 7/1997 | Yamaguchi et al. | 180/65.2 X |
| 5,931,757 | 8/1999 | Schmidt | 475/5 |
| 5,935,035 | 8/1999 | Schmidt | 475/5 |

*Primary Examiner*—Charles A. Marmor
*Assistant Examiner*—Ankur Parekh
*Attorney, Agent, or Firm*—Dean L. Ellis; Jeffrey A. Sedlar

[57] ABSTRACT

A vehicular transmission embodying the concepts of the present invention permits facile construction by virtue of a modular construction. Such a transmission has an open ended central housing module. The annular stator of one motor/generator is supported interiorly of the annular central housing module, in such a manner as to circumscribe the longitudinal axis of the annular central housing module. A rotor is operatively positioned interiorly of the stator. The modular transmission incorporates a modular input closure subassembly and/or a modular output closure modular subassembly. A closure subassembly has an end cap and a retaining shroud demountably attached to the end cap, and the closure subassembly is demountably secured to an open end of the central housing module. An input shaft member is coaxially and rotatably supported by the input closure subassembly, if employed, and an output shaft member is coaxially and rotatably supported by the output closure subassembly, if employed. One or more planetary gear subsets is coaxially supported in selected closure subassemblies to circumscribe the shaft member associated with the corresponding closure subassembly. A torque transfer device may be provided to selectively connect the planetary gear subsets and motor/generators to selected shaft members and selected shaft members to each other.

19 Claims, 7 Drawing Sheets

MODULARLY CONSTRUCTED VEHICULAR TRANSMISSION

TECHNICAL FIELD

The present invention relates generally to vehicular transmissions. More particularly, the present invention relates to vehicular transmissions that are capable of receiving input power from an engine as well as a source of stored electrical energy—either selectively or in combination. Specifically, the present invention relates to a vehicular transmission that can be constructed and assembled in a novel and unique modular manner,

BACKGROUND OF THE INVENTION

The purpose of a vehicular transmission is to provide a neutral, at least one reverse and one or more forward driving ranges that impart power from an engine, and/or other power sources, to the drive members which deliver the tractive effort from the vehicle to the terrain over which the vehicle is being driven. As such, the drive members may be front wheels, rear wheels or a track, as required to provide the desired performance.

Although a wide variety of transmission types are available, transmissions adapted to receive the output power from either an engine or an electric motor, or both, can be provided that will operate at high efficiencies over a wide variety of operating conditions. One transmission in the nature of a two-mode, input-split, parallel, hybrid electro-mechanical transmission is deemed to be particularly suitable to receive power from a vehicle engine and a power output member to deliver power to drive the vehicle. First and second motor/generators are connected to energy storage devices, such as batteries, so that the energy storage devices can accept power from, and supply power to, the first and second motor/generators. A control unit regulates power flow among the energy storage devices and the motor/generators as well as between the first and second motor/generators.

A variable, two-mode, input-split, parallel, hybrid electro-mechanical transmission also employs at least one planetary gear set. The planetary gear set has an inner gear member and an outer gear member, each of which meshingly engages a plurality of planet gear members. The input member is operatively connected to one of the gear members in the planetary gear set, and means are provided operatively to connect the power output member to another of the gear members in the planetary gear set. One of the motor/generators is connected to the remaining gear member in the planetary gear set, and means are provided operatively to connect the other motor/generator to the output shaft.

One particularly suitable arrangement is disclosed in copending U.S. patent application, Ser. No. 09/103,850 (Attorney Docket No. H-201729), filed Jun. 24, 1998, now U.S. Pat. No. 5,931,757, and which has also been assigned to General Motors Corporation. In that transmission the planetary gear arrangements, as well as the two motor/generators, are coaxially disposed and the motor/generators are each configured as an annulus which circumscribes one or more of the planetary gear arrangements such that the planetary gear arrangements are disposed radially inwardly of the motor/generators.

SUMMARY OF THE INVENTION

A primary aspect of the present invention provides a new and novel transmission configuration that is particularly suited to be made and assembled in modules. An input module and/or an output module may be separately constructed as closure subassemblies and then mounted in the appropriate end of a modular central housing. Motor/generators may be assembled within the central housing module prior to mounting the modular input and/or the output closure subassemblies in the central housing module. Planetary gear subsets, as well as torque transfer devices, may be preassembled in association with, or within, one or both of the desired modular input and output closure subassemblies prior to securing those modules in operative relation with respect to a central housing module in order to complete the assembly of a finished transmission.

Advantageously, the preferred modular transmission, as above, provides a minimum envelope—not only in its circumferential dimension but also its axial dimension. Additionally, the thrust loading generated by the configuration of the teeth in the planetary gearing associated with either the modular input or output closure subassembly can be reasonably restricted to that modular closure subassembly and not, therefore, be imparted, to any significant degree, to the other modules. Further, the lubrication distribution system can readily incorporate an enhancement to facilitate lubrication of the planet gears in any planetary gear subset in the transmission.

By way of a general introductory description, it should be understood that a transmission embodying the preferred concepts of the present invention permits facile modular assembly by virtue of the unique construction of the modules. Such a transmission has an annular central housing module, and the central housing module terminates in substantially open, oppositely disposed, first and second ends. The annular stator of at least one motor/generator may be supported interiorly of the annular central housing module, and preferably in such a manner as to circumscribe the longitudinal axis of the annular central housing module. A rotor may be operatively positioned interiorly of the stator. A central shaft member extends coaxially with respect to the longitudinal axis of the central housing module, and an annular collar circumscribes the central shaft member. A hub extends generally radially from the collar in order to permit an operative connection to the rotor.

The modular transmission also incorporates a modular input closure subassembly and/or a modular output closure modular subassembly. Typically, at least one closure subassembly has an end cap and a retaining shroud demountably attached to the end cap, and the closure subassembly may be demountably secured to the first or second substantially open end of the central housing module. Alternatively, the retaining shroud may be eliminated, and the planetary gear subsets associated with that closure subassembly may be confined by a structural interconnection to the associated rotor—an end cap being employed to secure the closure subassembly to the central housing module.

When an input closure subassembly is employed, an input shaft member is coaxially and rotatably supported by the input closure subassembly. Similarly, if an output closure subassembly is employed, an output shaft member is coaxially and rotatably supported by the output closure subassembly. One or more planetary gear subsets may be coaxially supported in selected closure subassemblies to circumscribe the shaft member associated with the corresponding closure subassembly. Means such as the well known torque transfer devices may be provided selectively to connect the planetary gear subsets and the desired motor/generator means to selected shaft members and selected shaft members to each other.

To acquaint persons skilled in the arts most closely related to the present invention, one preferred embodiment and an alternative variation of a two-mode, compound-split, electro-mechanical hybrid transmission that illustrate representative structural arrangements by which the modular construction may be achieved are described herein by, and with reference to, the annexed drawings that form a part of the specification. The aforesaid embodiments are described in detail without attempting to show all of the various forms and modifications in which the invention might be embodied. As such, the embodiments shown and described herein are illustrative, and, as will become apparent to those skilled in these arts, can be modified in numerous ways within the spirit and scope of the invention; the invention being measured by the appended claims and not by the details of the specification.

DESCRIPTION OF THE PREFERRED EMBODIMENT

One representative form of a hybrid transmission that can be readily assembled in conformity with the concepts of the present invention is designated generally by the numeral 10 on the accompanying drawings, and that preferred form of the transmission is depicted in FIGS. 1 through 6, inclusive. With particular reference, then, to those figures it will be observed that the hybrid transmission 10 is constructed to permit a unique modular assembly. That is, an over-all housing 12 is comprised of three modules. The first module is a generally annular, central portion 14 that is provided with first and second open end portions 16 and 18. The second module, in the nature of an input closure subassembly 20, is demountably secured to the first open end portion 16 of the central housing portion 14. The third module, in the nature of an output closure subassembly 22, is demountably secured to the second open end portion 18 of the central housing portion 14.

The mechanical operating structure of the transmission may be built into the three modules so that when the modules are connected to each other the structural mechanism of the transmission contained in the three modules will interconnect by virtue of that assembly, and as will become apparent, such an arrangement greatly simplifies the assembly of the structural mechanism which is the operating mechanism of the transmission.

The aforesaid hybrid transmission, to which co-pending U.S. patent application, Ser. No. 09/103,850 (Attorney's Docket No. H-201729) now U.S. Pat. No. 5,931,757 is directed, is relatively complex in that it is a two-mode, compound-split, electro-mechanical transmission that incorporates two motor/generators, three planetary gear subsets and two torque transfer devices. As such, it comprises an excellent example of how even a relatively complex transmission can be easily assembled by the modular approach to which the present invention is directed.

Figure 1:
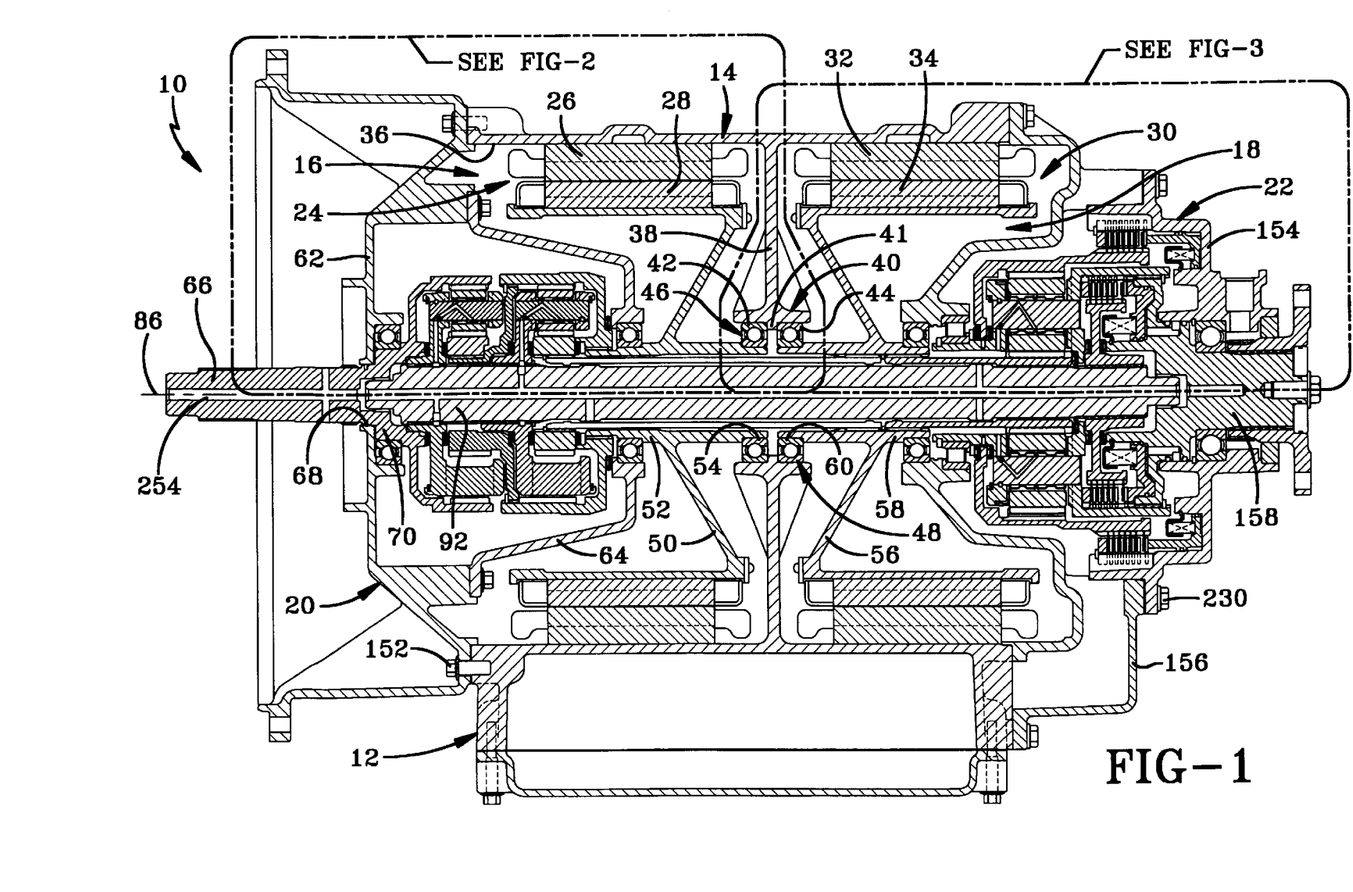
FIG. 1 is a diagrammatic representation of one preferred form of a two-mode, compound-split, electro-mechanical transmission embodying the concepts of the present invention in that it is particularly suited to modular construction.
Figure 2:
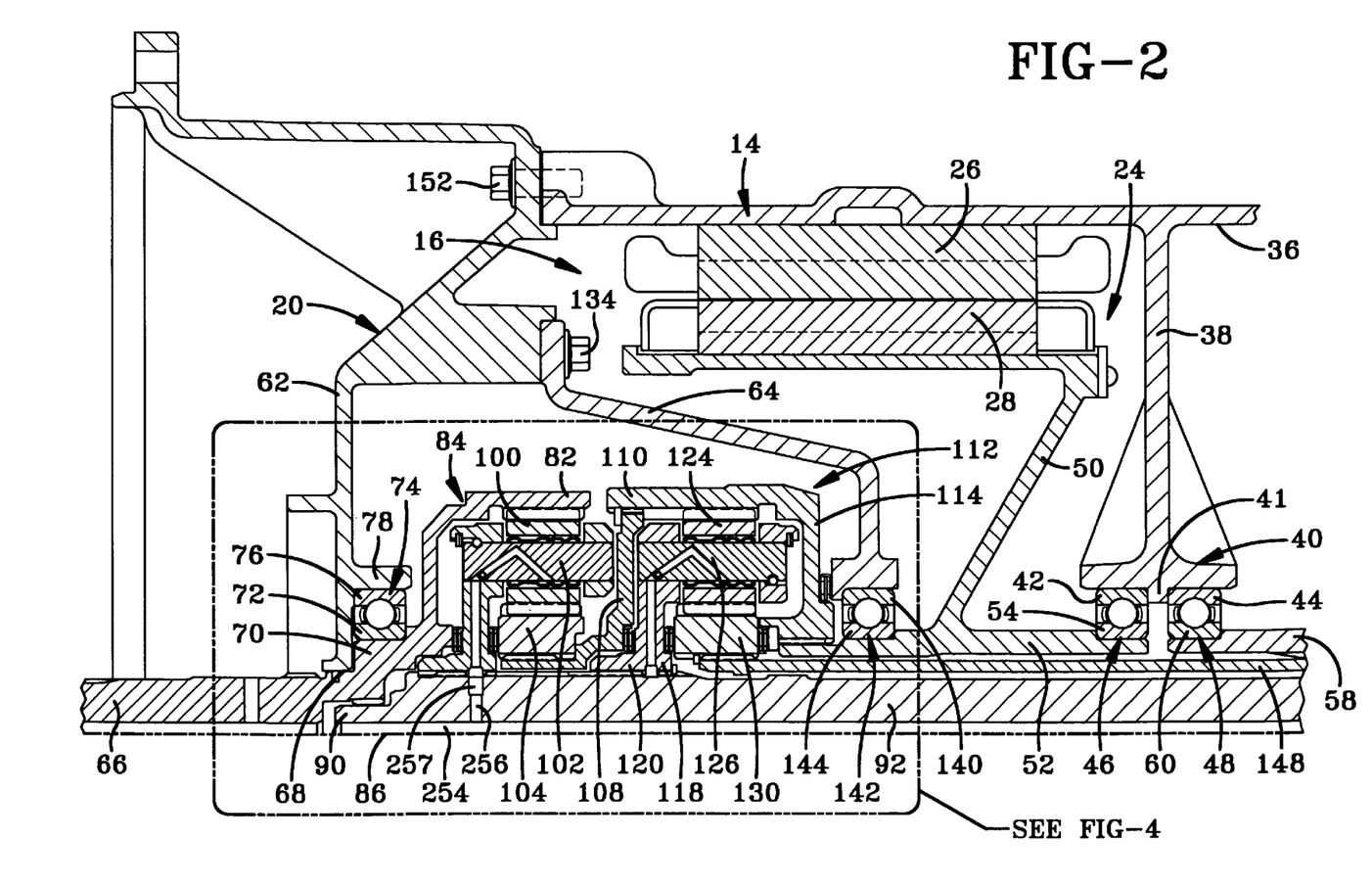
FIG. 2 is an enlarged diagrammatic representation of that portion of FIG. 1 defined by the chain-line rectangle designated as "see FIG. 2;"

With particular reference to FIGS. 1 and 2, it will be observed that a first motor/generator 24 has a stator 26 and a rotor 28. Similarly, and with particular reference to FIGS. 1 and 3, a second motor/generator 30 also has a stator 32 and a rotor 34. The two stators 26 and 32 are secured to a generally cylindrical, interior surface 36 of the central housing portion 14. A stanchion plate 38 extends radially inwardly from the medial portion of the interior surface 36 in the central housing portion 14 to terminate in a buttressed annular hub 40 that is partitioned, as at 41, to receive outer cages 42 and 44 of first and second bearings 46 and 48, respectively. As such, the stator 26 must be insertably received through the first open end 16 of the central housing portion 14, and stator 32 must be insertably received through the second open end 18 of the central housing portion 14.

When the first stator 26 is fixedly secured within the central housing portion 14, the first rotor 28 may be insertably received through the first end opening 16. As best seen by reference to FIG. 2, a connecting flange 50 secured to the first rotor 28 terminates radially inwardly of the rotor 28 in a collar 52 the inboard end of which engages inner cage 54 of the first bearing 46. Similarly, when the second stator 32 is fixedly secured within the central housing portion 14, the second rotor 34 may be insertably received through the second end opening 18. As best seen from FIG. 3, the connecting flange 56 secured to the second rotor 34 terminates radially inwardly of the rotor 34 in a collar 58 the inboard end of which engages the inner cage 60 of the second bearing 48.

Referring again to FIG. 2, the input closure subassembly 20 has an end cap 62 to which a retaining shroud 64 may, as will be hereinafter more fully explained, be demountably attached. However, prior to joinder of the end cap 62 and the retaining shroud 64 an input shaft member 66 is positioned to extend axially through a central aperture 68 in the end cap 62. A shoulder 70 is provided on that portion of the input shaft 66 located within the input closure subassembly 20. The shoulder 70 receives the inner cage 72 of an input shaft bearing assembly 74, an outer cage 76 of which is received on the radially inner surface of an annular flange 78 that not only circumscribes the central aperture 68 of the end cap 62 but also extends axially inwardly from the end cap 62.

Figure 4:
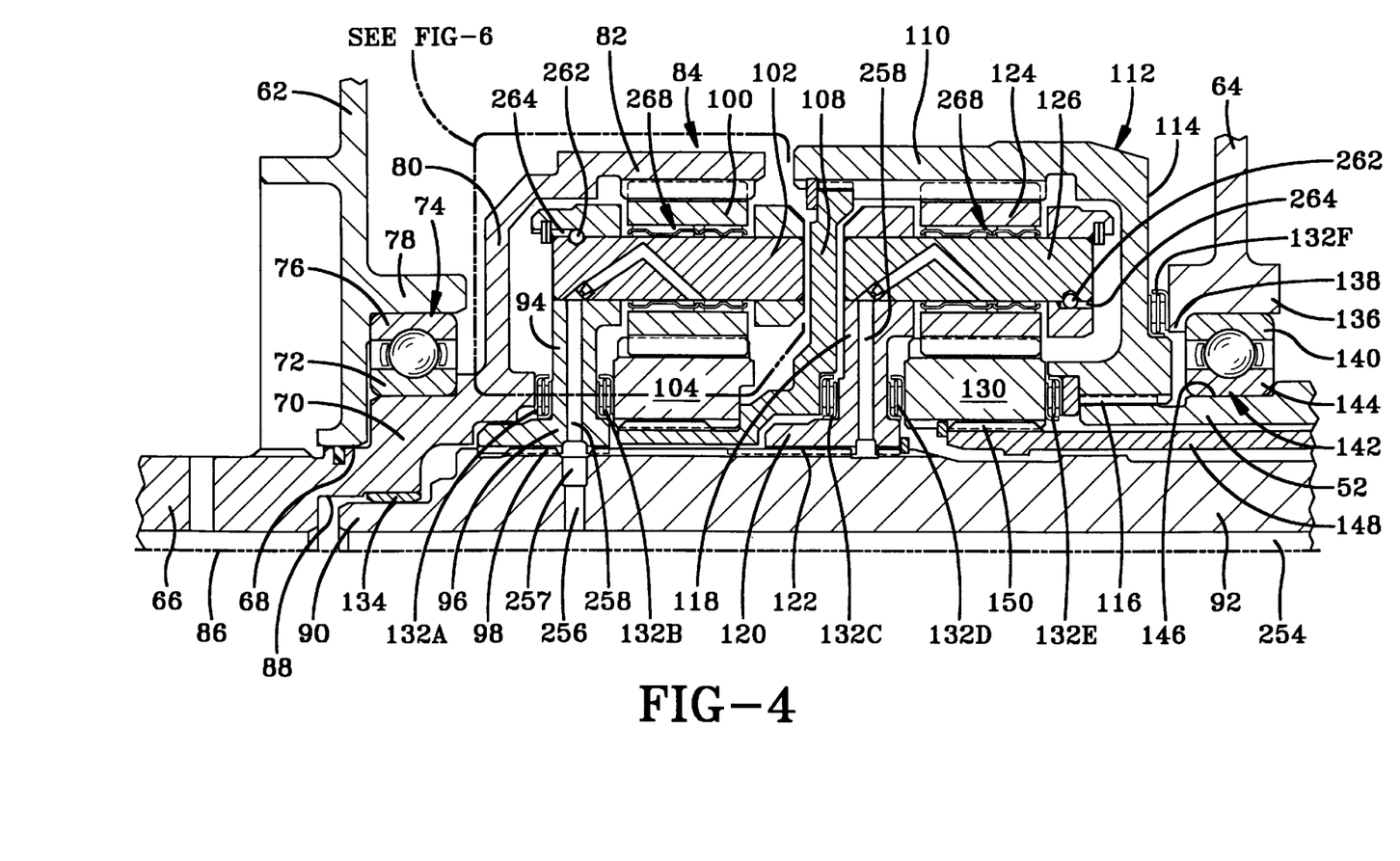
FIG. 4 is a further enlarged diagrammatic representation of that portion of FIG. 2 defined by the chain-line rectangle designated as "see FIG. 4;"

As best seen in FIG. 4, the input shaft member 66 has a bell portion 80 that extends radially outwardly from the shoulder 70 to terminate in a ring gear 82 of a first planetary gear subset 84. Disposed along a longitudinal axis 86 of the input shaft member 66, and thus radially inwardly of the bell portion 80, a pilot bore 88 is provided rotatably to receive a pilot extension 90 on central shaft 92 of the transmission 10.

With continued reference to FIG. 4, a carrier 94 of the first planetary gear subset 84 is provided with a central hub portion 96 that is operatively secured to the central shaft 92, as by a toothed connection 98. A planet gear 100 is rotatably mounted on each of a plurality of planet gear supporting shafts 102 that, in the carrier 94, constitute stub shafts that extend outwardly of the carrier 94 in parallel disposition relative to the axis 86 of the input shaft member 66 which axis 86 also constitutes the longitudinal axis of the central shaft 92 in the transmission 10. Each planet gear 100 meshingly engages the ring gear 82 as well as a sun gear 104 of the first planetary gear subset 84.

An inboard, or first, hub plate 108 extends radially between, and operatively connects, the sun gear 104 of the first planetary gear subset 84 to ring gear 110 of a second planetary gear subset 112, thereby compounding the operation of the individual planetary gear subsets 84 and 112. An outboard, or second, hub plate 114 extends radially inwardly of the ring gear 110 to terminate in a toothed connection to the collar 52 (See FIG. 2) presented from the radially innermost extent of the connecting flange 50 secured to the rotor 28 of the first motor/generator 24. The aforesaid toothed connection is designated by the numeral 116 on FIG. 4.

With continued reference to FIG. 4, carrier 118 in the second planetary gear subset 112 is provided with a central hub portion 120 that is operatively connected to rotate with the central shaft 92 by virtue of a toothed connection 122 between the central hub portion 120 and the central shaft 92. A planet gear 124 is rotatably mounted on each of a plurality of planet gear supporting shafts 126 that may be stub shafts that extend outwardly of the carrier 118 in parallel disposition relative to the axis 86 of the central shaft 92 in the transmission 10. Each planet gear 124 meshingly engages the ring gear 110 as well as sun gear 130 of the second planetary gear subset 112.

The aforesaid first and second planetary gear subsets 84 and 112 can be assembled within the input closure assembly 20 before that assembly is attached to the central housing portion 14 of the transmission 10. In fact, not only the input shaft member 66 but, if desired, the central shaft 92 may also be positioned relative to the first and second planetary gear subsets 84 and 112, respectively, before the retaining shroud 64 is secured to the end cap 62, as by machine screws 134.

At this point it should be observed that by using an input closure subassembly 20 within which the first and second planetary gear subsets 84 and 112 are captured, the resistance to rotation of the gear members occasioned by the axial component of the loading force imparted by virtue of the use of helical gear members in the first and second planetary gear subsets 84 and 112 are minimized. That is, annular thrust bearings such as needle bearings 132 depicted will enhance rotation of the gear members which might otherwise be impeded by the friction resulting from the axial loading component induced by the helical teeth of the gear members.

Specifically, a bearing member 132A may be interposed between the shoulder 70 of the input shaft member 66 and the carrier 94 in the first planetary gear subset 84. A second bearing member 132B may be interposed between the carrier 94 and the sun gear 104 of the first planetary gear subset 84. A third bearing member 132C may be interposed between the radially extending inboard hub plate 108 and the carrier 118 of the second planetary gear subset 112. A fourth bearing member 132D may be interposed between the carrier 118 and the sun gear 130, both in the second planetary gear subset 112. A fifth bearing member 132E may be interposed between the sun gear 130 and the radially extending outboard hub plate 114, and a sixth bearing member 132F may be interposed between the radially extending outboard hub plate 114 and the retaining shroud 64. As such, all axial forces induced by the helical threads on the gear members incorporated in the first and second planetary gear subsets 84 and 112 are substantially contained within the input closure subassembly 20, thereby minimizing deleterious frictional loading to the structural components of the transmission 10 located exteriorly of the input closure subassembly 20.

With particular reference to FIG. 4 it will be observed that the radially innermost extent of the retaining shroud 64 terminates in an annular hub 136 that may employ a radially directed retention flange 138 to capture an outer cage 140 of an annular bearing 142, an inner cage 144 of which is captured by an opposed recess 146 on the collar 52. For convenience, a sixth bearing member 132F may well engage the side of the hub 136 on the retaining shroud 64.

To secure the assembled input closure subassembly 20, as heretofore described, to the central housing portion 14, the annular bearing 142 is positioned in the recess 146 on the collar 52—which was previously installed within the central housing portion 14 with the first motor/generator 24. A sleeve shaft 148 is positioned over the central shaft 92, and the combined central shaft 92 and sleeve shaft 148 may either be inserted in the collar 52 or inserted in the assembled input closure subassembly 20. In either event, a toothed connection 150 between the sleeve shaft 148 and the sun gear 130 in the second planetary gear subset 112 must be effected, and the toothed connection 98 between the central shaft 92 and the carrier 94 of the first planetary gear subset 84 as well as the toothed connection 122 between the central shaft 92 and the carrier 118 of the second planetary gear subset 112 must be effected. As the input closure subassembly 20 is inserted through the first open end 16 of the central housing portion 14, the annular hub 136 will engage and capture the outer cage 140 of the bearing 142. At that point the input closure subassembly 20 is fully received within the central housing portion 14, and the input closure subassembly 20 may be secured in place by a plurality of machine screws 152.

Figure 5:
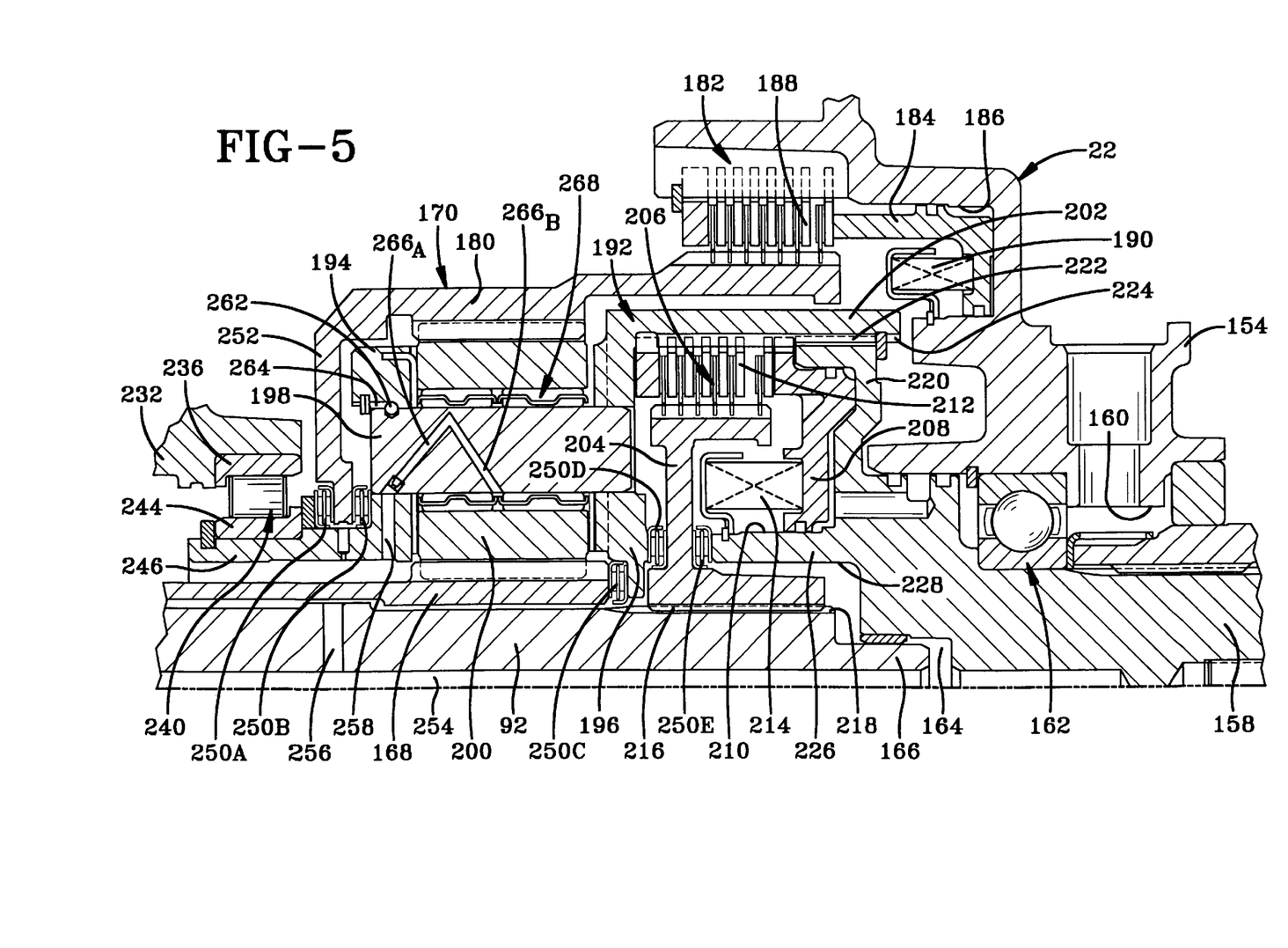
FIG. 5 is a further enlarged diagrammatic representation of that portion of FIG. 3 defined by the chain-line rectangle designated as "see FIG. 5;"

Turning now to the output closure subassembly 22, reference to FIGS. 1, 3 and 5 reveals that the output closure assembly 22 also has an end cap 154 that may, as will be hereinafter more fully explained, be demountably attached to the retaining shroud 156. However, prior to joinder of the end cap 154 and the retaining shroud 156 an output shaft member 158 is positioned to extend axially through a central aperture 160 in the end cap 154. A bearing assembly 162 is received in the central aperture 160 to assure free rotation of the output shaft member 158 relative to the end cap 154. As shown, a ball bearing may be employed to accommodate any residual longitudinal thrust, as will also be hereinafter more fully explained. A pilot bore 164 is provided within the inboard end of the output shaft member 158 rotatably to receive a second pilot extension 166 on that end of the central shaft member 92 opposite the previously described pilot extension 90.

A sleeve-like sun gear 168 is incorporated in a third planetary gear subset 170. The sleeve-like sun gear 168 circumscribes the central shaft member 92 to be relatively rotatably received thereon. The cylindrical outer periphery on the inboard end portion of the sleeve-like sun gear 168 presents a toothed portion 172 (FIG. 3) that meshingly engages a first set of opposed teeth 174 provided on the inner surface of the annular collar 58. A toothed portion 176 is also presented on the longitudinally adjacent, cylindrical outer periphery of the sleeve shaft 148. The toothed portion 176 meshingly engages a second set of teeth 178 that are also provided on the inner surface of the annular collar 58. Through collar 58 and sleeve shaft 148, therefore, the second motor/generator 30—i.e., the rotor 34—may be continuously connected to the sun gear 130 in the second planetary gear subset 112 and at the same time be continuously connected to the sleeve-like sun gear 168 in the third planetary gear subset 170.

Referring again to FIG. 5, a ring gear 180 in the third planetary gear subset 170 is selectively grounded to the transmission housing 12—through the end cap 154 and retaining shroud 156—by virtue of a well known torque transfer device 182 that is selectively actuated by pressurized fluid which drives the operating piston 184 in a cylinder 186 to engage the interleaved, friction clutch disks 188. Upon depressurization of the cylinder 186 a spring 190 biases the torque transfer device 182 to disconnect the ring gear 180 from ground—i.e.: from the conjoined end cap 154, the retaining shroud 156 and the transmission housing 12.

The third planetary gear subset 170 also utilizes a carrier 192. The carrier 192 has opposed side plates 194 and 196 that are disposed in spaced opposition. A plurality of planet gear supporting shafts 198 extend in longitudinally parallel disposition between the spaced side plates 194 and 196, and a planet gear 200 is rotatably mounted on each supporting shaft 198. Each planet gear 200 meshingly engages both the ring gear 180 and the sleeve-like sun gear 168.

The side plate 196 of carrier 192 is provided with an annular extension 202 that is selectively conjoined to a connecting torus 204 by virtue of a second of the well known torque transfer devices 206. The transfer device 206 is also actuated by pressurized fluid that drives its operating piston 208 of a cylinder 210 to engage the interleaved friction clutch disk 212. Engagement of the interleaved, friction clutch disks 212 selectively conjoins the connecting torus 204 to the carrier 192. Upon depressurization of the cylinder 210, a spring 214 biases the torque transfer device 206 into disengagement such that the annular extension 202 on the carrier 192 rotates relative to the connecting torus 204. The radially innermost extent of the connecting torus 204 presents teeth 216 that engage opposed teeth 218 on the central shaft 92.

It should also be observed that the carrier 192 may be continuously connected to the output shaft member 158. Specifically, a connecting arm 220 extends radially outwardly from the output shaft member 158 and terminates in teeth 222 that meshingly engage opposed teeth 224 located on the radially inner surface of the annular extension 202 provided on the side plate 196 of the carrier 192 in the third planetary gear subset 170.

The aforesaid third planetary gear subset 170 and associated first and second torque transfer devices 182 and 206 can be assembled within the output closure subassembly 22 before that assembly is attached to the central housing portion 14 of the transmission 10. As was heretofore mentioned, the output shaft member 158 is disposed to extend through the central aperture 160 in the end cap 154. As such, the output shaft member 158 must be inserted through the end cap 154 from that side of the end cap 154 which will lie adjacent the interior of the output closure subassembly 22.

That portion of the first torque transfer device 182 secured to the end cap 154 may then be assembled and located within the radially central portion of the end cap 154. Thereafter, that portion of the second torque transfer device 206 and the connecting torus 204 is positioned concentrically about an annular rim 226 that defines a counter bore 228 relative to the pilot bore 164 in the output shaft member 158. The diameter of the counter bore 228 must be sufficient to receive the central shaft 92 as well as that portion of the connecting torus 204 from which the teeth 216 are presented to engage the opposed teeth 218 on the central shaft 92. Thereafter, the third planetary gear subset 170 is assembled to the components previously positioned relative to the end cap 154, and the retaining shroud 156 may then be secured to the end cap 154, as by machine screws 230.

It should be noted that the radially inner terminus of the retaining shroud 156 presents an annular hub 232 that is partitioned to receive the outer cages 234 (FIG. 3) and 236 (FIG. 5) of a ball bearing assembly 238 and a roller bearing assembly 240, respectively. The inner cage 242 (FIG. 3) of the ball bearing assembly 238 is received on the outboard end portion of collar 58. The inner cage 244 (FIG. 5) of the roller bearing assembly 240 is received on an annular extension 246 presented from the radially inner portion of side plate 194 included in the carrier 192. The ball bearing assembly 238 is employed primarily to accommodate axial, or thrust, loading, and the roller bearing assembly 240 is employed primarily to accommodate radial loading, such as one might anticipate encountering by virtue of the connection of the output shaft member 158 with external mechanisms.

With the third planetary gear subset 170 and the two torque transfer devices 182 and 206 encased within the output closure subassembly 22, and with the various components therein ready to be included within the transmission 10—assuming that the input closure subassembly 20 and the central shaft 92 are already in place—the sleeve-like sun gear 168 may be positioned either over the central shaft 92 extending into the central housing portion 14 or within the output closure subassembly 22 in engagement with the planet gears 200. The output closure subassembly 22 is then inserted in position relative to the second open end of the central housing portion 14 and secured in place by machine screws 248 that attach the retaining shroud 156 to the central housing portion 14.

As was explained with respect to the input closure subassembly 20, and as is equally important with respect to the output closure subassembly 22, the resistance to rotation of the gear members in the third planetary gear subset 170 occasioned by the axial component of the loading force imparted by the use of helical gear members may be minimized by capturing the third planetary gear subset 170 within the output closure subassembly 170.

That is, annular thrust bearings, such as the needle bearings 250 depicted, will enhance rotation of the gear members which might otherwise be impeded by the friction resulting from the axial loading component induced by the helical teeth of the gear members. Specifically, a bearing member 250A may be interposed between the inner race 244 of the roller bearing assembly 240 and the web plate 252 that extends radially inwardly from the inboard side of the ring gear 180 to lie adjacent the inboard side plate 194 of the carrier 192. A second bearing member 250B may be interposed between the web plate 252 and one side plate 194 of the carrier 192. A third bearing member 250C may be interposed between the sleeve-like sun gear 168 and the other side plate 196 of the carrier 192. A fourth bearing member 250D may be interposed between the side plate 196 of carrier 192 and the connecting torus 204. A fifth bearing member 250E may be interposed between the connecting torus 204 and the annular rim 226 presented from the output shaft member 158. As such, all axial forces induced by the helical threads on the gear members incorporated in the third planetary gear subset 170 are substantially contained within the output closure subassembly 22, thereby minimizing deleterious frictional loading to the structural components of the transmission 10 located exteriorly of the output closure subassembly 22.

In addition to the unique mode of assembly, the transmission 10 also incorporates a novel means by which to lubricate the bearing assemblies interposed between each planet gear and the carrier shaft on which that planet gear is rotatably mounted.

Figure 6:
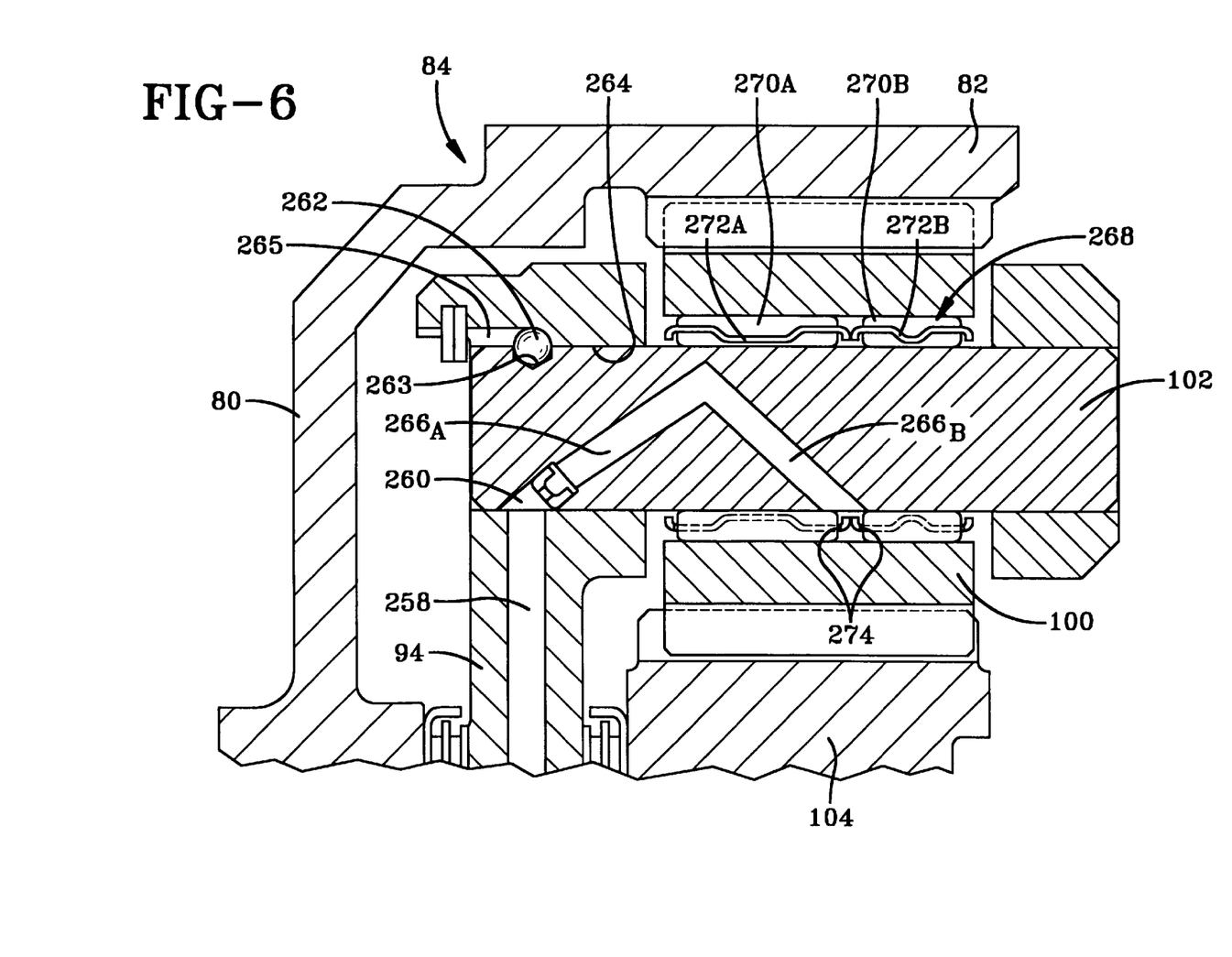
FIG. 6 is an even further enlarged diagrammatic representation of that portion of FIG. 4 defined by the chain-line rectangle designated as "see FIG. 6;" and, FIG. 7 is an enlarged diagrammatic representation similar to FIG. 2 but showing an alternative embodiment of an input closure subassembly.

As is typical, the central shaft 92 may be provided with an axial bore 254 (FIG. 1) through which lubricating fluid may be directed. A plurality of radial bores 256 (FIG. 2) communicate between the axial bore 254 and an annular linking passage 257 on the exterior of the central shaft 92. With reference now to FIG. 6, a feeder passage 258 extends radially outwardly through each carrier 94, 118 and 192 to effect communication between the annular linking passage 257 in the central shaft 92 and a distribution duct 260 in the planet gear supporting shafts 102, 126 and 198.

With continued reference to FIG. 6, it must be appreciated that for the most favorable operation, the planet gear supporting shafts 102, 126 and 198 are each secured against rotation relative to the respective carrier 94, 118 and 192 to which the planet gear supporting shafts are secured. The result may be readily accomplished by the use of a spherical locking ball 262 that is disposed to project radially outwardly from a blind bore 263 in the appropriate planet gear supporting shaft (102 depicted) and to be received in an axial groove 265 that extends at least partially along the bore 264 in which the supporting shaft 102 is received.

Although the distribution duct 260 may only be inclined to extend diagonally away from the feeder passage 258 with which it is associated, the distribution duct may, as shown, comprise two intersecting ducts 266A and 266B in order to dispense the lubricating fluid as near the medial portion of the bearing assembly 268 on which each planet gear is received as possible.

Typically, the planet gears are rotatably supported on a plurality of roller bearing members 270 that are received in annular cages 272 that present a plurality of axially extending perforations 274 which are spaced circumferentially about the periphery of the annular cage 272. As shown, the bearing members 270 are typically disposed in tandem. That is, there are two annular cages 272A and 272B that are disposed side-by-side between each planet gear 100, 124 and 200 and the respective supporting shafts 102, 126 or 198 on which the planet gears 100, 124 and 200 are rotatably supported. Similarly, therefor, there are also two sets of roller bearing members 270A and 270B. Thus, injection of the lubricating fluid from the ducts 266B will occur between the two circumferential rows of bearing members 270 and their cages 272.

Alternative Embodiment

Figure 7:
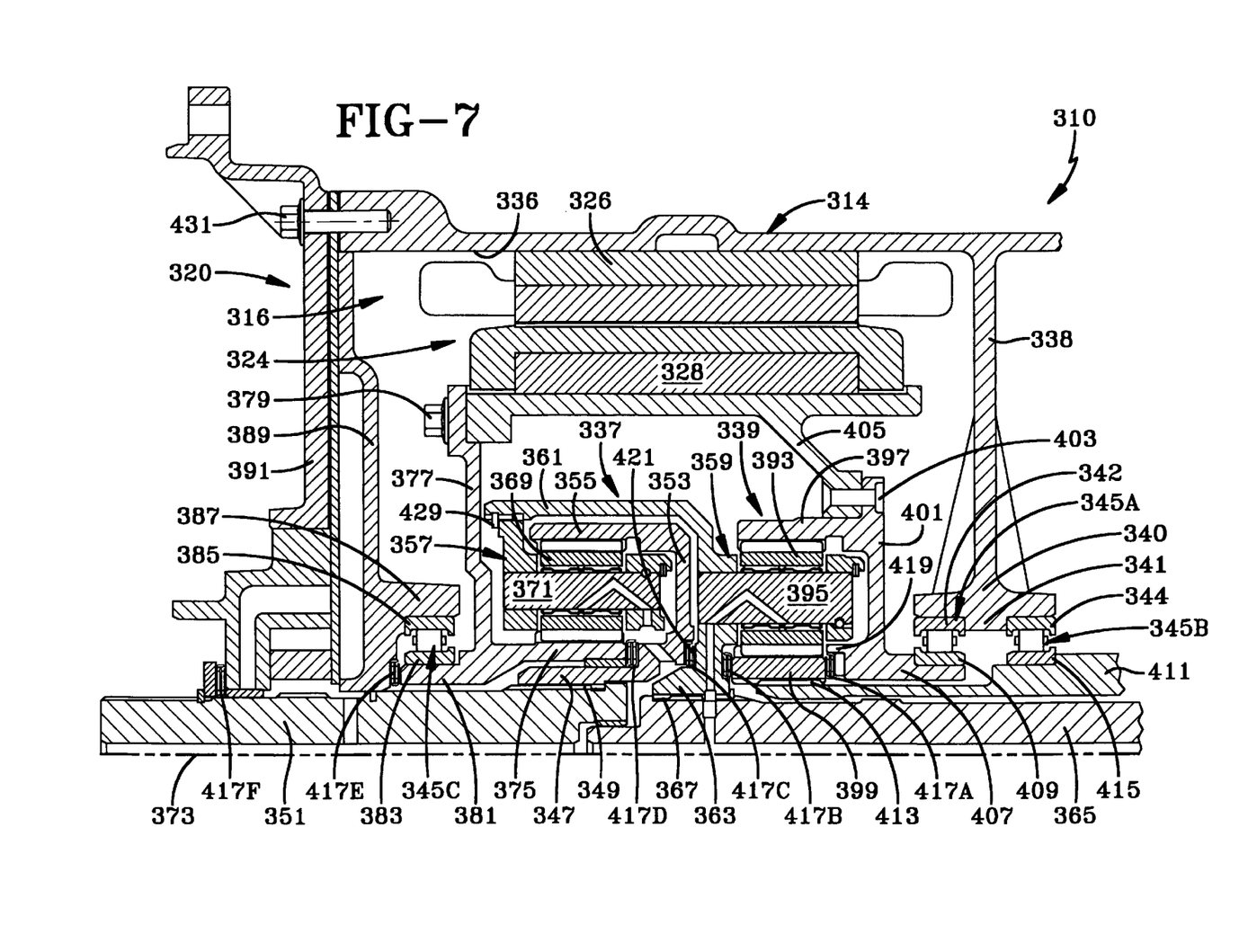

With particular reference to FIG. 7, an alternative input closure subassembly 320 is depicted for use in an alternative form of transmission 310. Although the structure by which the planetary gear subsets in input closure subassembly 320 are functionally compounded are not the same as the compounding structure in the input closure subassembly 10, they are functionally identical. With that preface, the input closure subassembly 320 is insertably received in an open end 316 of central housing portion 314 as is the input closure subassembly in the transmission 10 depicted in FIGS. 1–6. Before detailing the configuration of the input closure subassembly 320, it should be stressed that the resulting transmission 310 may employ an output closure subassembly that is identical to the output closure subassembly 22 depicted in FIGS. 3 and 5. As such, a description of the output closure subassembly shall not be reiterated.

With reference, then, to the transmission 310 it will be observed that it employs a first motor/generator 324 having a stator 326 and a rotor 328. The stator 326 is secured to a generally cylindrical, interior surface 336 of the central housing portion 314. As such, the stator 326 is insertably received through the first end opening 316 of the central housing portion 314. When the stator 326 is fixedly secured within the central housing portion 314, the rotor 328 may also be insertably received through the first end opening 316. However, in this embodiment the rotor 328 is connected to the hereinafter described first and second planetary gear subsets 337 and 339 in a manner that axially captures the planetary gear subsets 337 and 339 relative to the rotor 328, as will be hereinafter more fully described.

Figure 3:
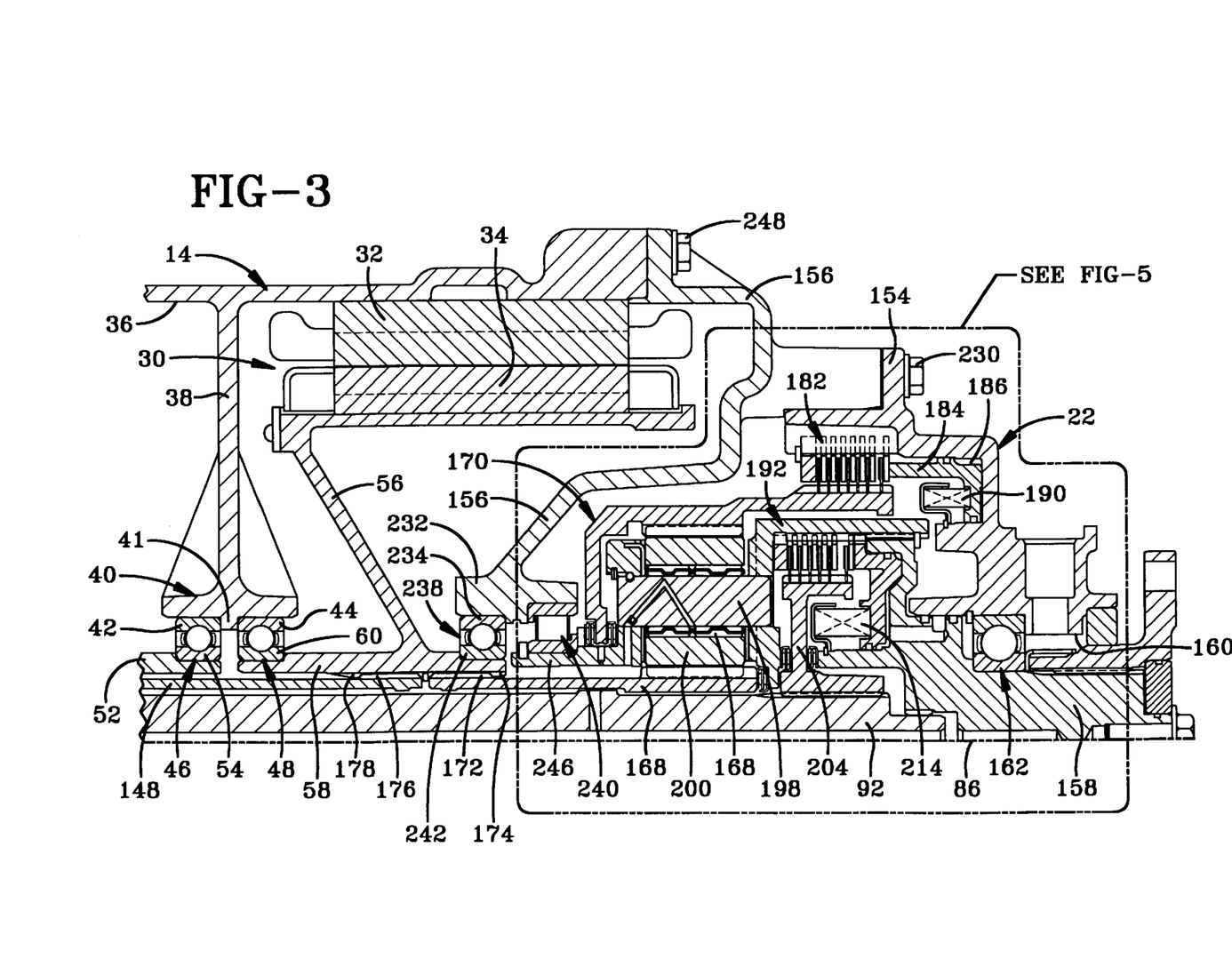
FIG. 3 is an enlarged diagrammatic representation of that portion of FIG. 1 defined by the chain-line rectangle designated as "see FIG. 3;"

The central housing portion 314 is closely akin to the central housing portion 14 depicted in FIGS. 1–3. That is, the stanchion plate 338 which extends radially inwardly from the medial portion of the interior surface 336 in the central housing portion 314 terminates in a buttressed annular hub 340 that is partitioned, as at 341. However, the hub 340 receives the outer cages 342 and 344 of first and second roller bearings 345A and 345B rather than the ball bearings 44 and 46 employed in transmission 10. This substitution is recommended for the alternative transmission 310, because the roller bearings 345 will likely be subjected not only to the axial, or thrust, loading to which bearings 44 and 46 are primarily subjected but also to radial loading. Moreover, the use of roller bearings allows one to press fit the races into their respective supporting structure, thereby augmenting the potential for the desired concentricity of the rotating members supported thereon and thus even better control, or virtually eliminate, vibration in the resulting transmission.

A splined collar 347 continuously engages a mating spline 349 on the input shaft 351. A hub plate 353 extends radially outwardly from the splined collar 347 to terminate in ring gear 355 of the first planetary gear subset 337. A carrier 357 in the first planetary gear subset 337 is connected to carrier 359 in the second planetary gear subset 339 by a bell-shaped yoke 361 that circumscribes the ring gear 355. The conjoined carriers 357 and 359 present a central hub portion 363 that is operatively secured to a central shaft 365, as by a toothed connection 367. A planet gear 369 is rotatably mounted on each of a plurality of planet gear supporting shafts 371 that, in the carrier 357, constitute stub shafts which extend outwardly of the carrier 357 in parallel disposition relative to the axis 373 of the input shaft member 351—which axis 373 also constitutes the longitudinal axis of the central shaft 365 in the transmission 310. Each planet gear 369 meshingly engages the ring gear 355 as well as a sun gear 375 in the first planetary gear subset 337.

The sun gear 375 is fixedly secured to the rotor 328, as by a radially extending connecting disk 377 the outer perimeter of which may be secured to the rotor 328 by a plurality of machine screws 379. A stabilizing collar 381 extends axially outwardly from the sun gear 375 to receive an inner race 383 of a roller bearing 345C. An outer race 385 of the roller bearing 345C is supported from an annular ledge 387 that extends axially from an inner reinforcing plate 389 presented from the end cap 391 of the modular input closure subassembly 320.

The carrier 359 in the second planetary gear subset 339 also has a plurality of planet gears 393 each of which is rotatably mounted on its own planet gear supporting shaft 395 that may also be a stub shaft that extends outwardly of the carrier 359 in parallel disposition relative to the axis 373 of the central shaft 365 in the transmission 310. Each planet gear 393 meshingly engages a ring gear 397 as well as sun gear 399 of the second planetary gear subset 339.

The ring gear 397 extends axially from a radially disposed strut 401. The strut 401 extends radially outwardly with respect to the ring gear 397 to be connected, as by a plurality of rivets 403, to a connecting flange 405 that extends radially, or conically as depicted, inwardly from the rotor 328. The strut 401 also extends radially inwardly with respect to the ring gear 397 to terminate in an annular collar 407 that circumscribes, but is not connected to, the central shaft 365. One portion of the collar 407 supports the inner race 409 which receives the roller bearings 345A.

The sun gear 399 is annular such that the teeth present on the radially outer circumference meshingly engage with the teeth on the planet gears 399. The teeth presented on the radially outer circumference meshingly engage the teeth presented from sleeve shaft 411 to effect a toothed connection 413 therebetween in the same manner that the toothed connection 150 is effected between the sleeve shaft 148 and the sun gear 130 in the second planetary gear subset 112 of transmission 10, as best seen in FIG. 4. With continued reference to FIG. 7 it will be observed that the sleeve shaft 411 also supports an inner race 415 which receives the roller bearings 345B.

As with transmission 10, the modular input closure subassembly 320 of transmission 310 also utilizes a plurality of needle bearings to react against the resistance to rotation of the gear members occasioned by the axial component of the loading force imparted by virtue of the use of helical gear members in the first and second planetary gear subsets 337 and 339. Annular thrust bearings such as the needle bearings 417 depicted will enhance rotation of the gear members which might otherwise be impeded by the friction resulting from the axial loading component induced by the helical teeth of the gear members.

Specifically, a bearing member 417A may be interposed between the radially disposed shoulder 419 on the collar 407 at the radially innermost extent of the strut 401 and the sun gear 399 in the second planetary gear subset 339. A second bearing member 417B may be interposed between the sun gear 399 and the central hub portion 363 of the conjoined carriers 357 and 359. A third bearing member 417C may be interposed between the central hub portion 363 of the conjoined carriers 357 and 359 and a recess 421 located in proximity to the juncture of the hub plate 353 and the splined collar 347. A fourth bearing member 417D may be interposed between an oppositely directed shoulder 423 on the splined collar 347 attached to the ring gear 355 and the sun gear 375 of the first planetary gear subset 337. A fifth bearing member 417E may be interposed between the stabilizing collar 381 presented from the sun gear 375 in the first planetary gear subset 337 and the inner reinforcing plate 389 of the end cap 391, and a sixth bearing member 417F may be interposed between the end cap 391 and, either directly or indirectly, the input shaft 351. One may, as shown, employ a thrust washer 425 that is interposed between the bearing member 417F and a lock ring 427 that is seated in an annular recess 429 in the input shaft 351. It may, of course, be more convenient to use a structural member instead of the thrust washer 425. For example, one may position the hub of a damper or even a power take-off such that it engages the outboard end of the bearing member 417F. In any event, the axial forces induced by the helical threads on the gear members incorporated in the first and second planetary gear subsets 337 and 339 are substantially contained within the input closure subassembly 20, thereby minimizing deleterious frictional loading to the structural components of the transmission 310 located exteriorly of the input closure subassembly 320.

It must be further appreciated that the planet gear supporting shafts 371 and 395 may each be secured against rotation relative to the respective carriers 357 and 359 by the use of an arrangement employing the spherical locking ball 262 shown and described herein with respect to transmission 10. Likewise, lubrication fluid may be distributed to the planet gears 369 and 393 through a series of ducts and passages such as previously described herein in conjunction with the detailed explanation regarding lubrication of transmission 10.

The transmission 310 may incorporate an output closure subassembly identical to that utilized in transmission 10, and as such that aspect of the assembly is also identical to that previously described herein with respect to transmission 10. The first and second planetary gear subset 337 and 339 may be modularly constructed by assembling the second planetary gear subset 339 to the ring gear 397 and the strut 401 that are permanently affixed to the connecting flange 405 secured to the rotor 328. At that point, in time, the bell-shaped yoke 361 extends axially outwardly from the second planetary gear subset, and the ring gear 355—to which the input shaft 351 has been previously connected—together with the carrier 357 and the planet gears 369 may be inserted interiorly of the yoke 361 and retained in place, as by a snap ring 429. The sun gear 375 is then inserted between the splined collar 347 and the planet gears 369, and the modularly assembled first and second planetary gear subsets 337 and 339 may be fastened in place by tightening the machine screws 379 to the stator 328. The end cap 391 may then be secured to the central housing portion 314, as by a plurality of machine screws 431. With the foregoing components in place the last needle bearing 417F may be secured, either directly or indirectly, to the input shaft 351, as previously described.

The foregoing description delineates submodular assembly of the input closure assembly 320 in the central housing portion 314. In fact, the input closure subassembly may be partially, or fully, assembled apart from the central housing portion 314. That is, the rotor 328, with the planetary gear subsets 337 and 339 captured between the connecting flange 405 and the radial connecting disk 377, may be assembled outside the central housing portion 314 and then inserted with the end cap 391 subsequently applied. On the other hand, the first and second planetary gear subsets 337 and 339 may be assembled to the rotor 328, with the input (and even the central) shafts 351 and 365, respectively, operatively positioned with the end cap 391 in place and that entire subassembly is secured to the input shaft 351 before the input closure subassembly 320 is attached to the central housing portion 314. In either situation, modular construction is achieved for the alternative transmission 310.

In fact, either approach provides a transmission 310 having a minimized envelope of even lesser axial dimension than is accomplished by transmission 10. The minimal envelope achieved allows far greater flexibility in the design, orientation and location of the transmission relative to the engine—and even the engine itself. For that matter, greater flexibility is provided for accommodating the location and orientation of power take-off mechanisms and transverse drive adaptation.

Conclusion

The modularity of the present transmissions 10 and 310 are deemed to be more readily understood by describing the structural arrangement by which the modularity was achieved as applied to a specific transmission, and as such two, two-mode, compound-split, electro-mechanical vehicular hybrid transmissions were chosen because they constitute not only a current state of the art but also because they are sufficiently complex that the benefits resulting from modular construction can be more readily appreciated.

While only a preferred embodiment, and one alternative arrangement, of the present invention are disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

As should now be apparent, the present invention not only teaches that a transmission embodying the concepts of the present invention is capable of being modularly constructed but also that the other objects of the invention can likewise be accomplished.

We claim:

1. A transmission comprising:
    a central housing;
    said central housing terminating in first and second end portions, each of which are substantially open;
    at least one motor/generator having an annular stator insertably receivable through one of said end openings and supported interiorly of said central housing;
    a central shaft member extending completely through said central housing;
    a modular input closure subassembly demountably secured to said first substantially open end portion of said central housing module;
    a modular output closure subassembly demountably secured to said second substantially open end portion of said central housing module;
    an input shaft member coaxially and rotatably supported in said modular input closure subassembly;
    an output shaft member coaxially and rotatably supported in said modular output closure subassembly;
    one or more planetary gear subsets, each of said gear subsets supported in a selected modular closure subassembly of said modular input and output closure subasssemblies and being joined with the shaft member associated with said selected modular closure subassembly; and
    annular collar means circumscribing said central shaft member, said collar means operatively engaged to a gear member in one planetary gear subset of said one or more planetary gearsets.

2. A vehicular transmission adapted particularly to modular construction and assembly, said transmission comprising:
    an annular, central housing module having a longitudinal axis;
    said central housing module terminating in first and second end portions, each of which are substantially open;
    at least one motor/generator having an annular stator insertably receivable through one of said end openings to be supported interiorly of the annular central housing module so as substantially to circumscribe said longitudinal axis;
    a rotor operatively received interiorly of said stator;
    a central shaft member extending coaxially with respect to said longitudinal axis of said central housing module;
    a modular input closure subassembly demountably secured to said first substantially open end portion of said central housing module;
    a modular output closure subassembly demountably secured to said second substantially open end portion of said central housing module:
    an input shaft member coaxially and rotatably supported in said modular input closure subassembly;
    an output shaft member coaxially and rotatably supported in said modular output closure subassembly;
    one or more planetary gear subsets, each said gear subsets coaxially supported in a selected modular closure subassembly of said modular input and output closure subassemblies and being joined with the shaft member associated with said selected modular closure subassembly;
    said one or more planetary gear subsets each having a sun gear member, a ring gear member and a plurality of planet gear members rotatably supported on a carrier meshingly to engage said sun and ring gear members;
    annular collar means circumscribing said central shaft member, said collar means operatively engaged to a gear member in said one planetary gear subset; and
    at least one connecting flange extending generally radially from said collar means and being operatively connected to said rotor.

3. The vehicular transmission, as set forth in claim 2, further comprising:
    lubrication feeder passage means provided in said carrier means to receive lubricating fluid within said central housing module.

4. The vehicular transmission, as set forth in claim 2, wherein said input closure subassembly further comprises:
    a radially directed disk connecting said rotor to another of the gear members in said planetary gear subset.

5. The vehicular transmission, as set forth in claim 4, further comprising:
    compounded first and second planetary gear subsets received in said input closure subassembly;
    said annular collar operatively engaging a gear member in one said planetary gear subsets in said input closure subassembly;
    said radially directed connecting disk operatively engaging a gear member in the other of said planetary gear subsets in said input closure subassembly.

6. The vehicular transmission, as set forth in claim 5, wherein:
    said first and second planetary gear subsets in said input closure subassembly are captured between said connecting flange and said connecting disk.

7. The vehicular transmission, as set forth in claim 6, further comprising:
    an end cap secured to said central housing portion;
    a bearing interposed between said end cap and a gear member in one of said planetary gear subsets in said input closure subassembly.

8. The vehicular transmission, as set forth in claim 7, further comprising:
    means operatively associated with each said modular closure subassembly to insulate said central housing module from axial forces generated by said planetary gear subsets received in said modular closure subassemblies.

9. A vehicular transmission adapted particularly to modular construction and assembly, said transmission comprising:
- an annular, central housing module having a longitudinal axis;
- said central housing module terminating in substantially open first and second end portions;
- at least one motor/generator having an annular stator supported interiorly of the annular central housing module at least substantially to circumscribe said longitudinal axis;
- a rotor operatively positioned interiorly of said stator;
- a central shaft member extending coaxially with respect to said longitudinal axis of said central housing module;
- annular collar means circumscribing said central shaft member;
- a connecting flange extending generally radially from said collar means and being operatively connected to said rotor;
- at least one end cap;
- a retaining shroud demountably attached to said end cap in order to form at least one closure subassembly;
- a modular input closure subassembly and a modular output closure subassembly demountably secured to said first and second substantially open end portions respectively of said central housing module;
- an input shaft member coaxially and rotatably supported in said modular input closure subassembly;
- an output shaft member coaxially and rotatably supported in said modular output closure subassembly;
- one or more planetary gear subsets, each of said gear subsets coaxially supported in a selected modular closure subassembly of said modular input and output closure subassemblies and being joined with the shaft member associated with said selected modular closure subassembly; and
- means for selectively connecting said planetary gear subsets and said rotor to selected shaft members and to connect selected shaft members to each other.

10. The vehicular transmission, as set forth in claim 9, further comprising:
- said at least one end cap being first and second end caps;
- a first retaining shroud demountably attached to said first end cap to form said modular input closure subassembly;
- a second retaining shroud demountably attached to said second end cap to form said modular output closure subassembly.

11. The vehicular transmission, as set forth in claim 10, further comprising:
- means selectively to connect said planetary gear subsets and said rotor to selected shaft members and to connect selected shaft members to each other.

12. The vehicular transmission, as set forth in claim 10, wherein:
- at least one planetary gear subset is supported coaxially about said central shaft member between said first end cap and said first retaining shroud in said input closure subassembly;
- at least one planetary gear subset is supported coaxially about said central shaft member between said second end cap and said second retaining shroud in said modular output closure subassembly.

13. The vehicular transmission, as set forth in claim 12, further comprising:
- means provided in each of said modular input and output closure subassemblies to insulate said central housing module from axial forces generated by said planetary gear subsets received in said modular closure subassemblies.

14. The vehicular transmission, as set forth in claim 9, further comprising:
- thrust bearings operatively interposed to receive axial thrust loading generated by said planetary gear subsets and thereby minimizing transference of said thrust loading to said end cap and said retaining shroud in at least selected modular closure subassemblies.

15. The vehicular transmission, as set forth in claim 9, further comprising:
- said at least one motor/generator being first and second motor/generators;
- each said motor/generator having an annular stator that is supported interiorly of said annular central housing module;
- said stator for said first motor/generator is disposed in proximity to said first end portion of said central housing module;
- said stator for said second motor/generator is disposed in proximity to said second end portion of said central housing module;
- a first rotor is positioned interiorly of said stator in said first motor/generator;
- a second rotor is positioned interiorly of said stator in said second motor/generator;
- first and second annular collar means;
- a first hub extending substantially radially from said first collar means and being operatively connected to said rotor in said first motor/generator; and,
- a second hub extending substantially radially from said second collar means and being operatively connected to said rotor in said second motor/generator.

16. The vehicular transmission, as set forth in claim 15, further comprising:
- at least one planetary gear subset is supported coaxially about said input shaft member between said end cap and said retaining shroud in said modular input closure subassembly;
- at least one planetary gear subset is supported coaxially about said output shaft member between said end cap and said retaining shroud in said modular output closure subassembly.

17. The vehicular transmission, as set forth in claim 16, further comprising:
- means provided in each said modular closure subassembly to insulate said central housing module from axial forces generated by said planetary gear subsets received said modular closure subassemblies.

18. The vehicular transmission, as set forth in claim 17, further comprising:
bearing means presented from said retaining shroud in said modular input closure subassembly rotatably to support said first annular collar;
bearing means presented from said retaining shroud in said modular output closure subassembly rotatably to support said second annular collar.

19. The vehicular transmission, as set forth in claim 18, further comprising:
torque transfer means supported from at least one modular closure subassembly to effect operative connection between said planetary gear subsets and said rotor to selected shaft members and to connect selected shaft members to each other.

* * * * *